(12) United States Patent
Sun

(10) Patent No.: US 12,385,517 B1
(45) Date of Patent: Aug. 12, 2025

(54) SUCTION CUP STRUCTURE

(71) Applicant: Wei-tao Sun, Suzhou (CN)

(72) Inventor: Wei-tao Sun, Suzhou (CN)

(73) Assignee: Suzhou Zewo Import Export Co., Ltd., Suzhou (CN)

( * ) Notice: Subject to any disclaimer, the term of this patent is extended or adjusted under 35 U.S.C. 154(b) by 0 days.

(21) Appl. No.: 18/658,958

(22) Filed: May 8, 2024

(51) Int. Cl.
*F16B 47/00* (2006.01)

(52) U.S. Cl.
CPC .................................. *F16B 47/00* (2013.01)

(58) Field of Classification Search
CPC ....................................................... F16B 47/00
USPC ... 248/683, 537, 205.5, 205.8, 206.2, 206.3, 248/309.3, 362, 363
See application file for complete search history.

(56) References Cited

U.S. PATENT DOCUMENTS

| | | | | |
|---|---|---|---|---|
| 122,890 A * | 1/1872 | Hodgkins | ............... | F16B 47/00 248/205.8 |
| 2,315,566 A * | 4/1943 | Watral | ................... | A47K 10/04 16/86 A |
| 2,730,325 A * | 1/1956 | Van Dusen | ............ | F16B 47/00 248/205.8 |
| 3,180,604 A * | 4/1965 | Hammer | ............... | G03B 42/025 403/56 |
| 5,087,005 A * | 2/1992 | Holoff | ................ | A47G 23/0225 248/205.8 |
| 5,702,598 A * | 12/1997 | Lemon | ..................... | F01M 1/10 210/303 |
| 6,234,435 B1 * | 5/2001 | Yeh | ....................... | F16M 13/022 248/205.8 |
| D453,887 S * | 2/2002 | Meck | ............................. | D6/548 |
| 6,749,160 B1 * | 6/2004 | Richter | ................ | F16M 11/041 248/500 |
| 6,896,228 B1 * | 5/2005 | Lu | .......................... | A47K 10/10 248/205.8 |
| 7,243,806 B2 * | 7/2007 | Kwok | ..................... | A47K 10/10 248/206.3 |
| 7,293,750 B2 * | 11/2007 | Richter | ................... | F16B 47/00 248/205.8 |
| 9,822,924 B2 * | 11/2017 | Wu | ........................ | F16M 13/02 |
| 10,111,559 B2 * | 10/2018 | Edwards | .................. | A47K 1/09 |
| D981,754 S * | 3/2023 | Garland | ........................ | D6/549 |
| 2002/0190170 A1 * | 12/2002 | Ting | .......................... | E03C 1/06 248/205.5 |
| 2010/0038503 A1 * | 2/2010 | Chien | ................... | F16B 47/006 248/205.8 |
| 2010/0288893 A1 * | 11/2010 | Tan | ........................ | F16B 47/00 248/205.5 |
| 2023/0304527 A1 * | 9/2023 | Zimmerman | ........... | F16B 47/00 |

* cited by examiner

*Primary Examiner* — Muhammad Ijaz

(57) ABSTRACT

A suction cup structure includes a housing including a connector and a bracket. A tube is connected to the connector. The bracket includes an accommodation recess. A magnet is located within the accommodation recess and a gasket is at a center of the magnet. A suction cup assembly includes a screw component and a suction cup. The screw component includes a head portion which is securely connected to a protrusion on a top of the suction cup. The head portion includes passages in which material of the protrusion of the suction cup is filled during production. The threaded shaft of the screw component extends through the gasket and is threadedly connected to a screw hole located within the accommodation recess of the housing.

7 Claims, 10 Drawing Sheets

SUCTION CUP STRUCTURE

BACKGROUND OF THE INVENTION

1. Fields of the Invention

The present invention relates to a suction cup structure, specifically applied in the field of household products.

2. Descriptions of Related Art

In daily life, it is common for items to be placed by hanging them up. A commonly used method is to install suction cups with hooks on the wall, so that the position of hanging can be adjusted at any time. However, many suction cups, although initially strong enough, lose their suction power significantly after a few times of falling off, leading to frequent dropping. Additionally, there is another problem: sometimes the plastic cup attached to the wall by the suction cup can detach from the assembly due to weight reasons. Apart from the above issues, there is also a problem with the assembly. Generally, the assembly between the outer shell and the plastic cup is secured with a screw buried in one end of the plastic cup and locked with the other end of the screw into the outer shell. However, when the force locking the screw to the outer shell exceeds the combined force of the plastic cup and the screw, the plastic cup may slip relative to the screw. Therefore, how to solve the above problems is something that professionals in this field must consider.

The present invention intends to provide a suction cup structure to eliminate the shortcomings mentioned above.

SUMMARY OF THE INVENTION

The present invention relates to a suction cup structure and comprises a housing including a connector and a bracket. The connector includes an end hole. One of two ends of a tube is connected to the end hole of the housing. The bracket includes an accommodation recess. A magnet is located within the accommodation recess and has a central perforation. A gasket is located in the central perforation. A suction cup assembly comprises a screw component and a suction cup. The screw component includes a threaded shaft and a head portion. The head portion is connected to a protrusion on a top of the suction cup. The suction cup has a suction recess formed in an underside thereof. The head portion includes multiple passages. A material of the protrusion of the suction cup is filled in the passages during production to form multiple ribs in the passages. The threaded shaft of the screw component extends through the gasket and is threadedly connected to a screw hole located within the accommodation recess of the housing.

The present invention includes an advantage in the combination of the screw component and the suction cup of the suction cup assembly. There is no spinning between the screw component and the suction cup when they are mutually locked with the housing. This ensures a secure assembly between the suction cup assembly and the housing, and the connection between the screw component and the housing prevents detachment between the suction cup assembly and the hanger. By utilizing the installation of the magnet, the present invention is able to adhere to metal objects. Through the magnetic force of the magnet combined with the vacuum status generated between the suction recess of the suction cup and the adherent object, it can firmly adhere to the object and prevent detachment.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
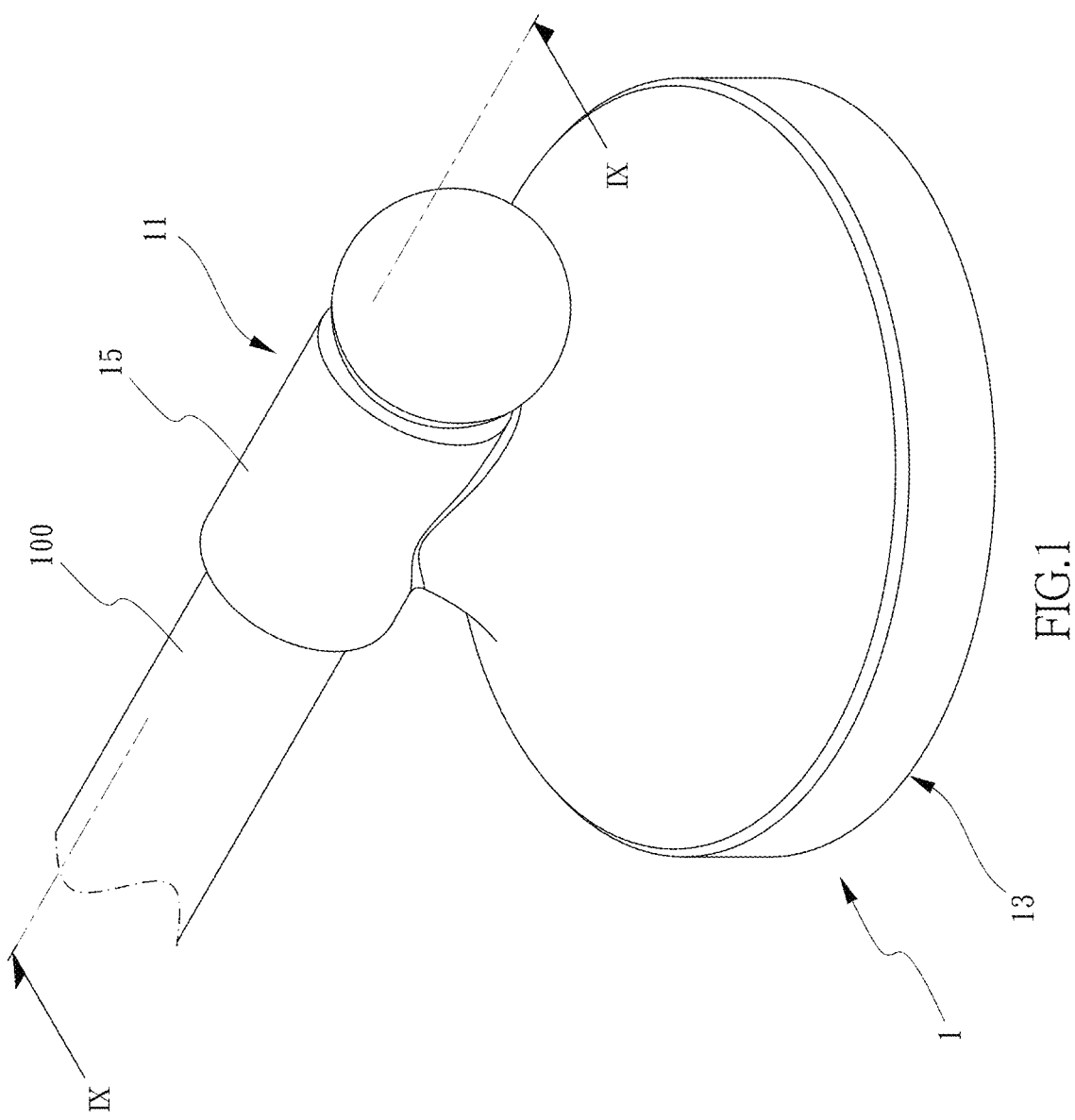
FIG. 1 is a perspective view of the present invention.
Figure 2:
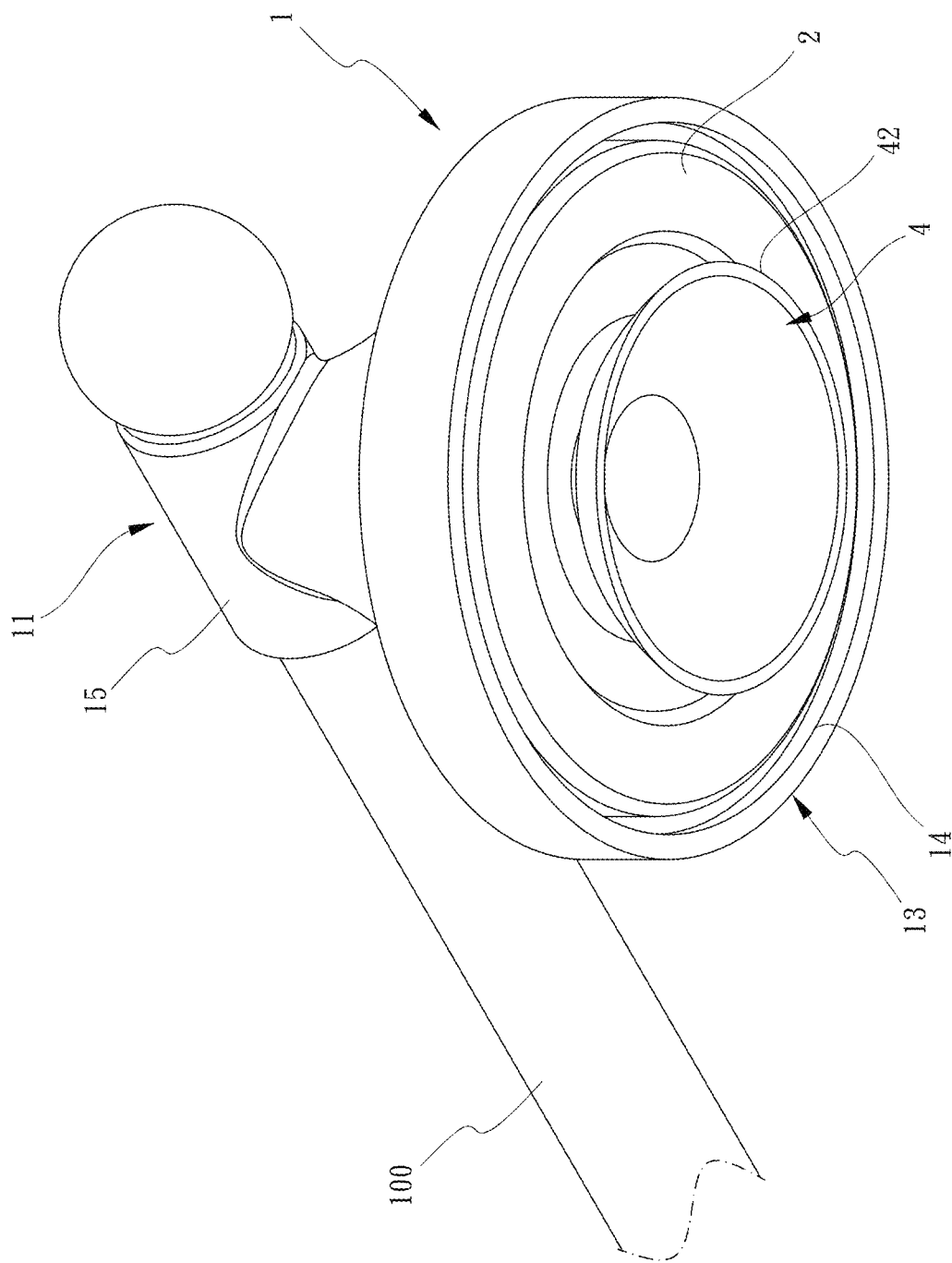
FIG. 2 is another perspective view of the present invention.
Figure 3:
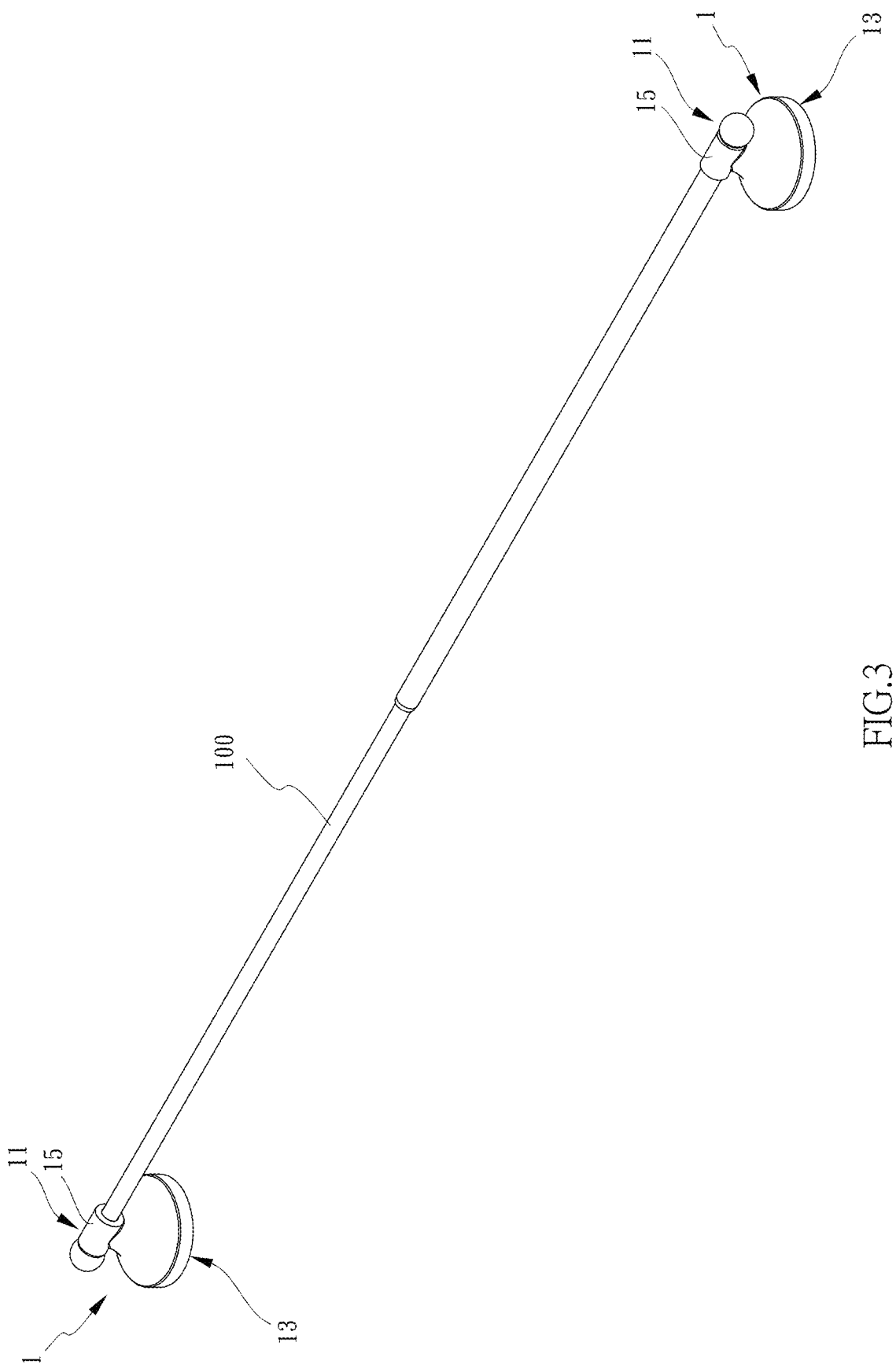
FIG. 3 shows that two suction cups of the present invention are connected to two ends of a tube.

Referring to FIGS. 1 to 10, the suction cup structure of the present invention comprises a housing 1 including a connector 11 and a conical bracket 13. One end of the connector 11 has an end hole 12, and the housing 1 is sleeved onto either end of a tube 100 via the end hole 12. FIG. 3 shows that both ends of the tube 100 are equipped with a housing 1. The bracket 13 is radially formed to the connector 11 and has an accommodation recess 14. The accommodation recess 14 is concavely formed inward to an underside of the bracket 13. A disk-shaped magnet 2 is installed within the accommodation recess 14 and has a central perforation 21. A gasket 3 is inserted into the central perforation 21. A suction cup assembly 4 comprises a screw component 41 and a suction cup 42, wherein the suction cup 42 is conical in shape. The screw component 41 includes a threaded shaft 411 and a head portion 412. The head portion 412 is connected to a protrusion 421 integrally formed on a top of the suction cup 42, while a concaved suction recess 422 is formed to an underside of the suction cup 42. The suction cup 42 is deformed and adheres to a flat surface such as a wall or floor via the suction recess 422. The head portion 412 includes multiple passages 413, and the material of the protrusion 421 of the suction cup 42 is filled into the passages 413 during production so as to form multiple ribs 423 in the respective passages 413. The threaded shaft 411 of the screw component 41 extends through the gasket 3 and is connected to a screw hole 141 formed in an inside of the accommodation recess 14 of the housing 1.

Specifically, during the production of the suction cup 42, the head portion 412 of the screw component 41 is embedded into the protrusion 421, while the threaded shaft 411 protrudes from the protrusion 421. Because the suction cup 42 and the protrusion 421 are made of plastic, the plastic melts during production. As a result, the plastic will fill the passages 413 of the head portion 412. Once the production of the suction cup 42 is completed via steps of air-dried and hardened, the plastic will form ribs 423 and take shape within the passages 413. This ensures that the threaded shaft 411 of the screw component 41, when interlocking with the housing 1, does not allow the head portion 412 to spin freely within the protrusion 421, making the assembly between the suction cup 42 and the housing 1 more secure.

Furthermore, to securely mount the magnet 2 within the accommodation recess 14, a positioning member 5 is provided. The positioning member 5 is disk-shaped and forms a recessed area 51 on one side, wherein the recessed area 51 faces the suction cup 42. The positioning member 5 is installed within the accommodation recess 14 of the housing 1. An outer peripheral surface of the peripheral wall of the positioning member 5 abuts against an inner periphery of the accommodation recess 14. The positioning member 5 is made of metal, primarily to facilitate the magnet 2 being firmly magnetically attracted within the recessed area 51 of the positioning member 5 so as to enhance the magnetic force of the magnet 2. Finally, the threaded shaft 411 of the screw component 41 is connected to the housing 1.

Through the placement of the positioning member 5, the secure installation of the magnet 2 is ensured, and more importantly, contact between the magnet 2 and the housing 1 is avoided, preventing damage. In addition, because the housing 1 is conical, the placement of the positioning member 5 achieves the effect of preventing the magnet 2 from slipping off, as shown in FIGS. 5 to 9.

Figure 4:
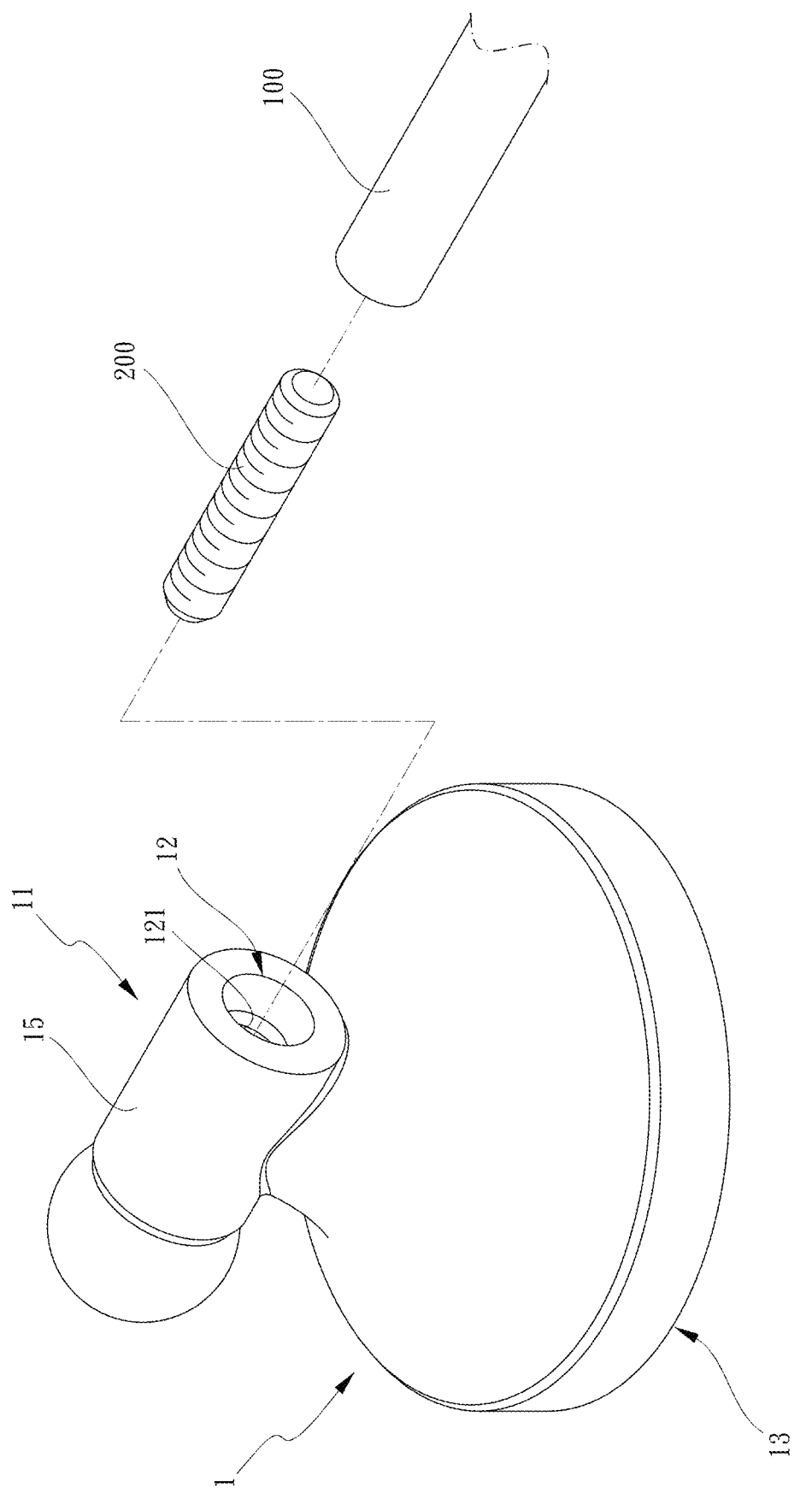
FIG. 4 is an exploded view of the housing and the tube of the present invention.
Figure 5:
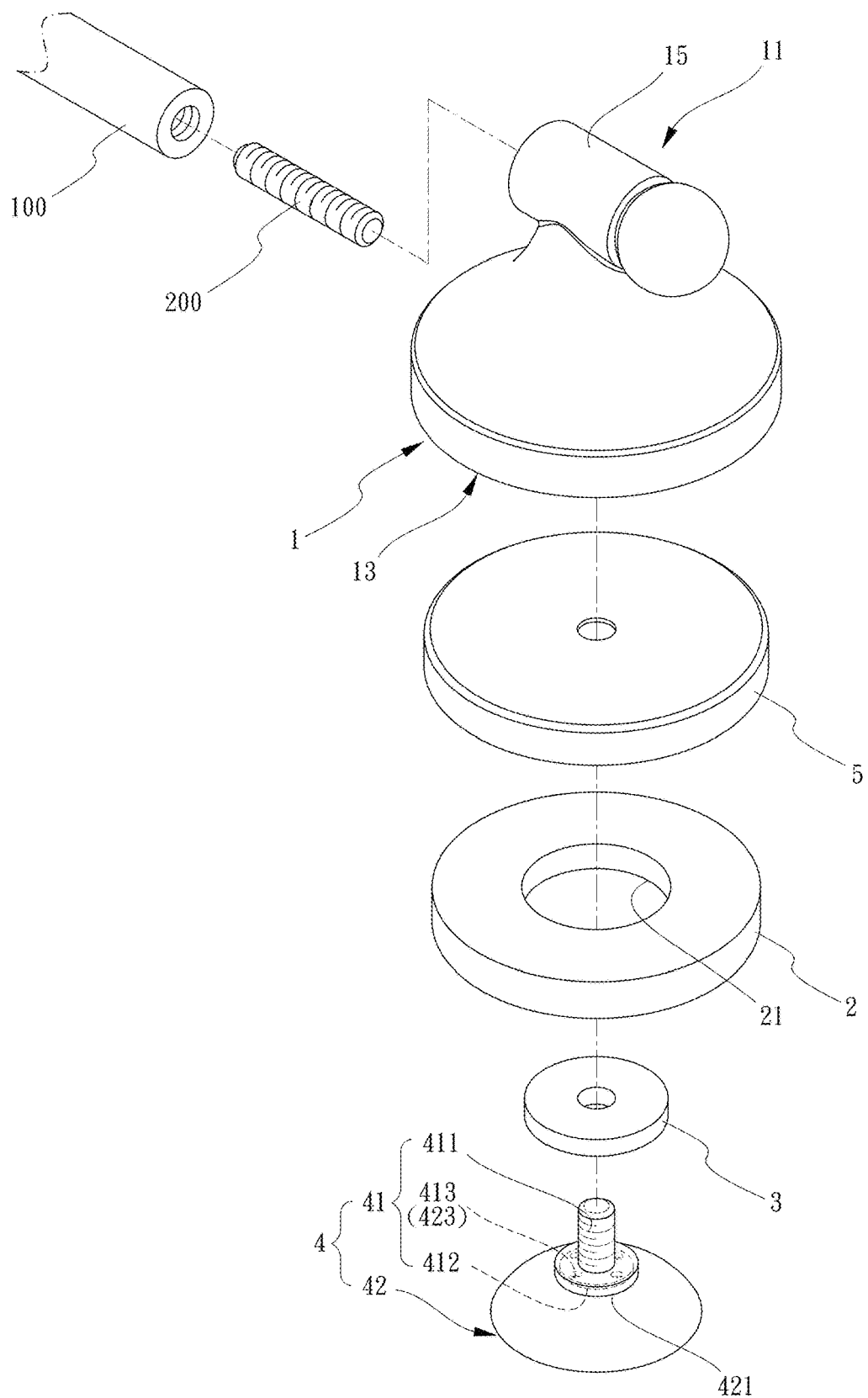
FIG. 5 is an exploded view of the suction cup structure of the present invention.
Figure 9:
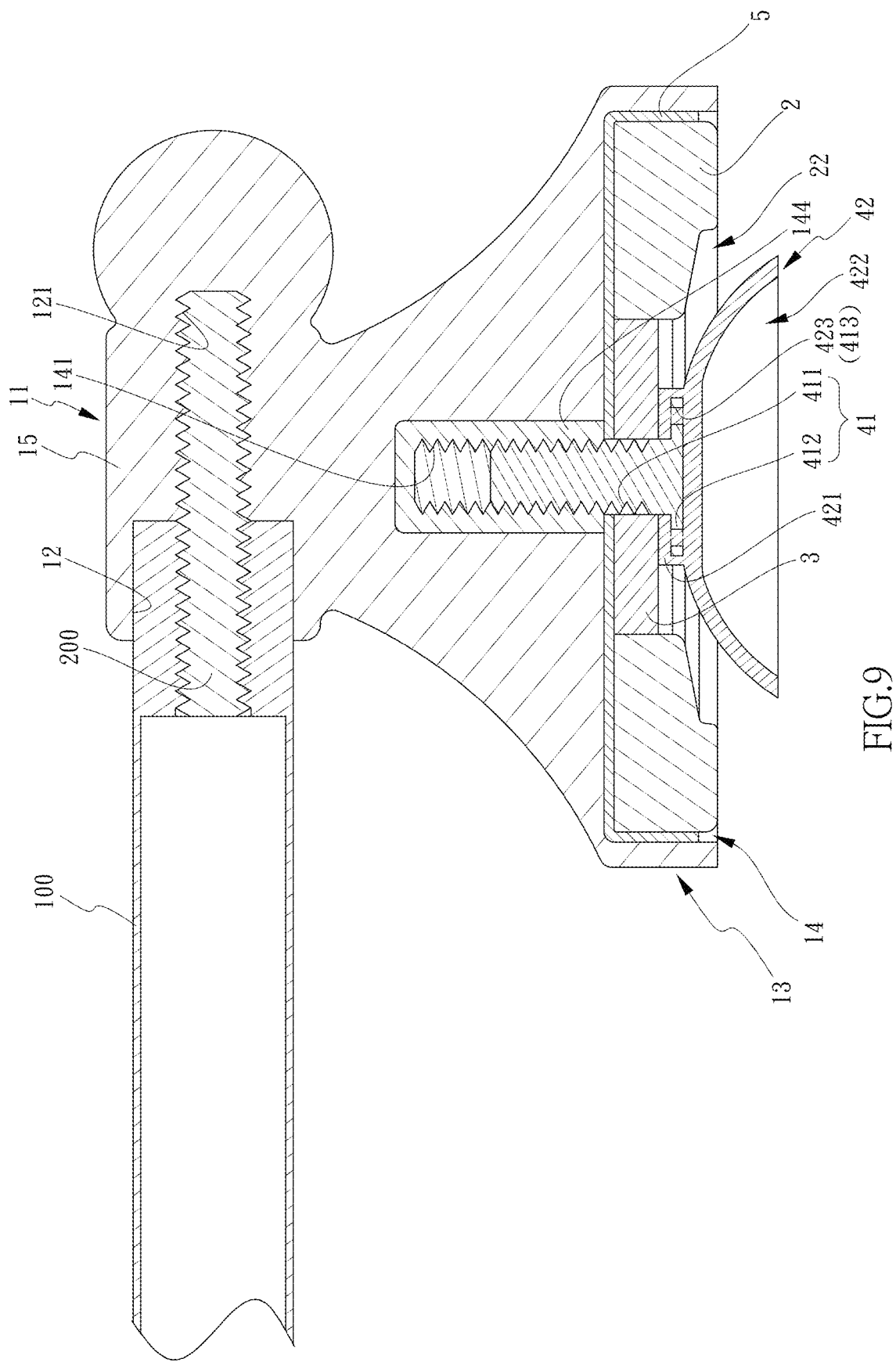
FIG. 9 is a cross sectional view, taken along line the IX-IX of FIG. 1.

To reinforce the housing 1 to bear the weight of items hung on the tube 100, as shown in FIGS. 4 and 9, a central part 142 is formed to a center of the accommodation recess 14 of the housing 1. Multiple flanges 143 are formed between an outer periphery of the central part 142 and an inner periphery of the accommodation recess 14. The central part 142 includes a threaded sleeve 144 located centrally in a distal end thereof. The screw hole 141 is formed in the threaded sleeve 144, and threaded shaft 411 of the screw component 41 is threadedly connected to the screw hole 141 of the threaded sleeve 144. The placement of the flanges 143 strengthens the housing 1 to bear weight, preventing deformation due to inadequate weight-bearing capacity.

As shown in FIGS. 1 to 4, the connector 11 of the housing 1 is integrally formed with a cylindrical block 15 at the top of the housing 1, with a first end of the block 15 sealed off. The end hole 12 is concavely formed in a second end of the block 15. A threaded hole 121 is formed in the bottom surface of the end hole 12. One end of the tube 100 has a threaded rod 200, which can be either integrally installed with the tube 100 or separately as independent components. After inserting one end of the tube 100 with the threaded rod 200 into the end hole 12, the threaded rod 200 is mutually screwed and locked with the threaded hole 121. This completes the assembly combination between the present invention and the tube 100.

Figure 6:
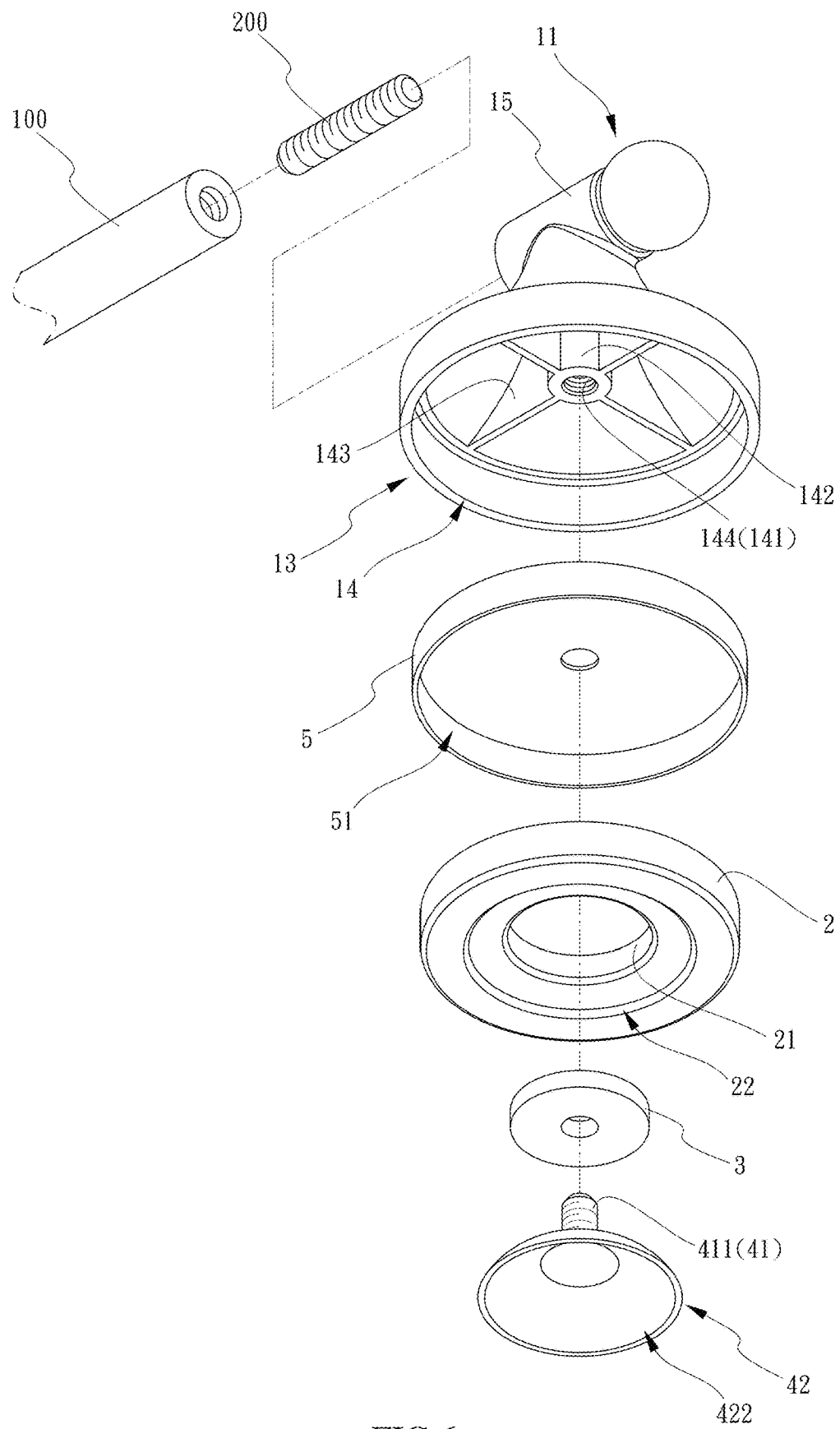
FIG. 6 is another exploded view of the suction cup structure disclosed in FIG. 5.
Figure 7:
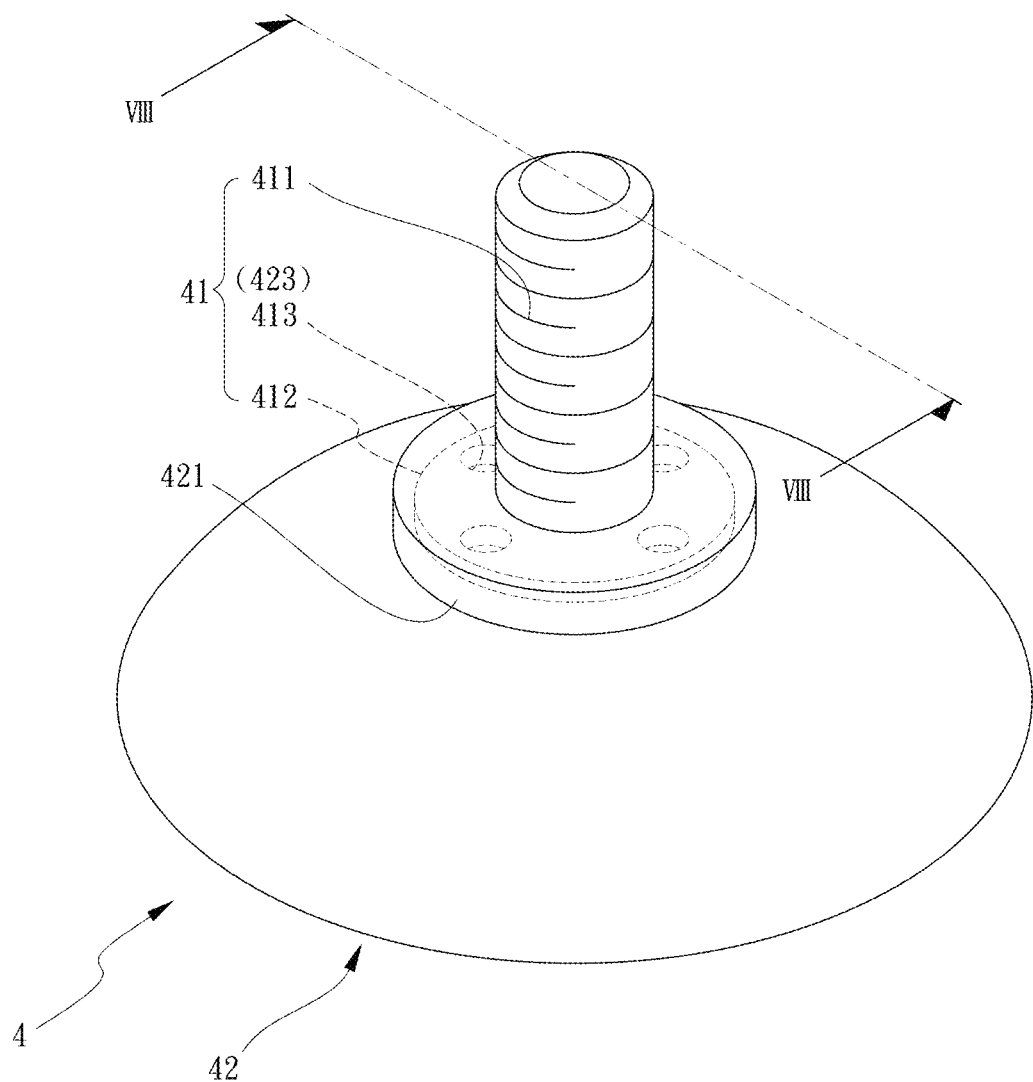
FIG. 7 is a perspective view of the suction cup of the present invention.
Figure 8:
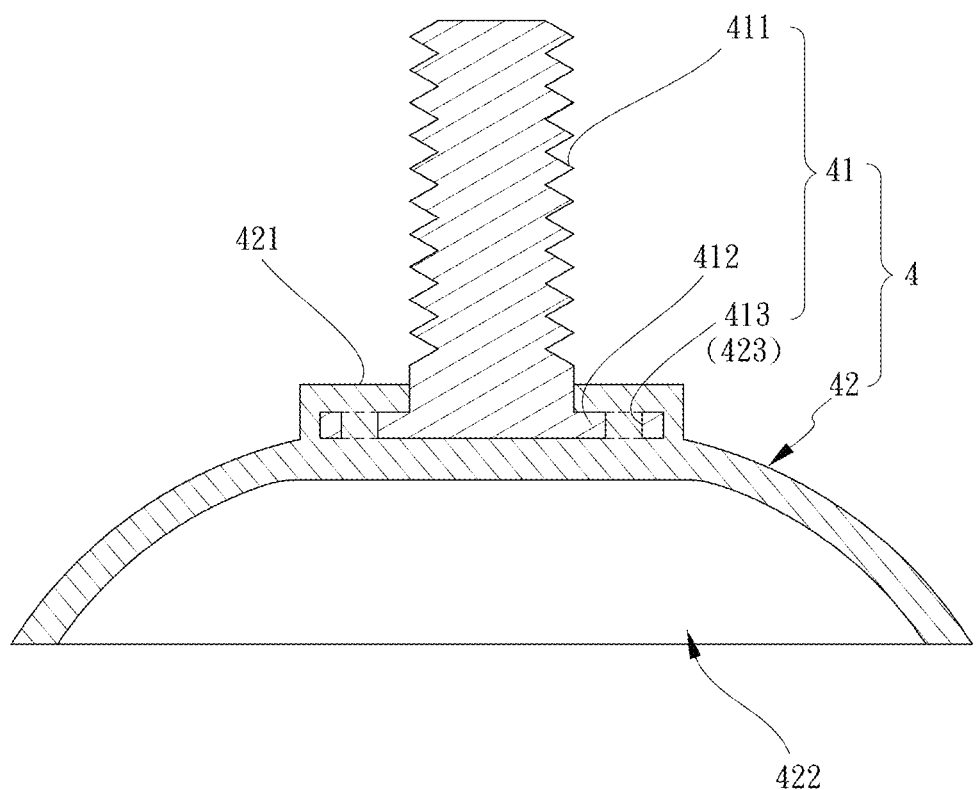
FIG. 8 is a cross sectional view, taken along line VIII-VIII of FIG. 7.
Figure 10:
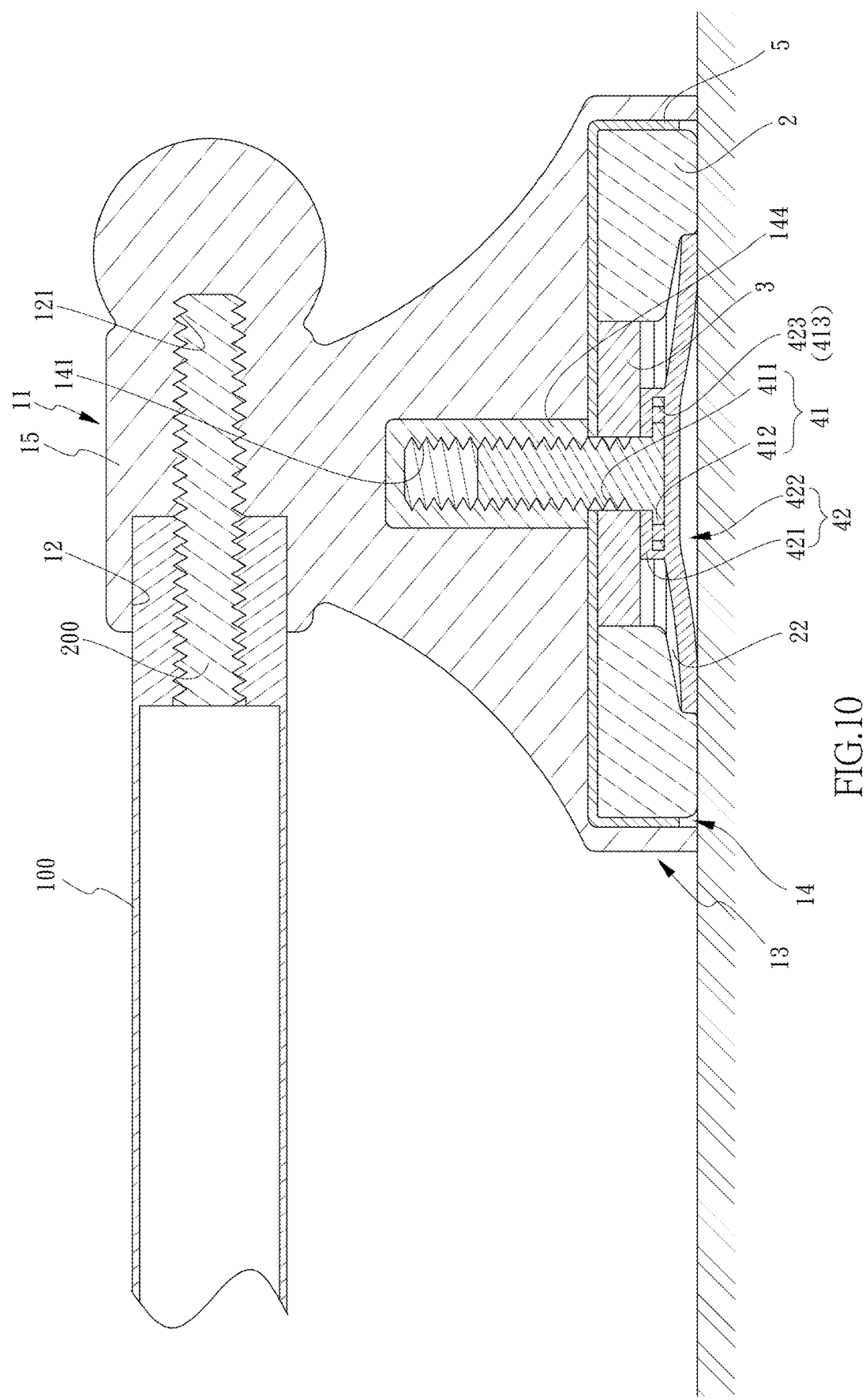
FIG. 10 is a cross sectional view of the suction cup adhered to an object.

The present invention primarily utilizes the passages 413 in the head portion 412 of the screw component 41, and the material characteristics of the suction cup 42 during production, the material fills the passages 413 during production. After air-drying and hardening, the formation of ribs 423 prevents the screw component 41 from spinning relative to the suction cup 42, ensuring a secure connection between the suction cup 42 and the housing 1. This prevents issues where proper adhesion cannot be achieved. Additionally, through the installation of the magnet 2, as shown in FIGS. 6, 9 and 10, the present invention is able to adhere to metallic objects.

The magnet 2 includes a recessed area 22 located corresponding to the suction cup 42. When the suction cup 42 is deformed, the suction cup 42 is accommodated within the recessed area 22.

Furthermore, the adhesion between the magnet 2 and the metallic object can also block external air from easily entering the suction recess 422, thereby maintaining the suction of the suction cup 42 on the metallic object and preventing detachment. Compared to the problems listed in the prior art, the present invention effectively addresses previous issues and is more suitable for widespread use by the public.

While we have shown and described the embodiment in accordance with the present invention, it should be clear to those skilled in the art that further embodiments may be made without departing from the scope of the present invention.

What is claimed is:

1. A suction cup structure comprising:
   a housing (1) including a connector (11) and a bracket (13), the connector (11) including an end hole (12), one of two ends of a tube (100) connected to the end hole (12) of the housing (1), the bracket (13) including an accommodation recess (14);
   a magnet (2) located within the accommodation recess (14) and having a central perforation (21), a gasket (3) located in the central perforation (21), and
   a suction cup assembly (4) comprising a screw component (41) and a suction cup (42), the screw component (41) including a threaded shaft (411) and a head portion (412), the head portion (412) connected to a protrusion (421) on a top of the suction cup (42), the suction cup (42) having a suction recess (422) formed in an underside thereof, the head portion (412) including multiple passages (413), the protrusion (421) of the suction cup (42) being formed in the passages (413) that provides multiple ribs (423) in the passages (413), the threaded shaft (411) of the screw component (41) extending through the gasket (3) and threadedly connected to a screw hole (141) located within the accommodation recess (14) of the housing (1).

2. The suction cup structure as claimed in claim 1, wherein a positioning member (5) is installed within the accommodation recess (14) of the housing (1), the positioning member (5) is a disk-shaped member and includes a peripheral wall extending from a periphery thereof so as to form a recessed area (51) in an underside of the positioning member (5), an outer peripheral surface of the peripheral wall of the positioning member (5) abuts against an inner periphery of the accommodation recess (14).

3. The suction cup structure as claimed in claim 1, wherein a central part (142) is formed to a center of the accommodation recess (14) of the housing (1), multiple flanges (143) are formed between an outer periphery of the central part (142) and an inner periphery of the accommodation recess (14).

4. The suction cup structure as claimed in claim 3, wherein the central part (142) includes a threaded sleeve (144) located centrally in a distal end thereof, the screw hole (141) is formed in the threaded sleeve (144), the screw component (41) is threadedly connected to the screw hole (141) of the threaded sleeve (144).

5. The suction cup structure as claimed in claim 1, wherein the suction cup (42) is deformed to create a vacuum state between the suction cup (42) and an object.

6. The suction cup structure as claimed in claim 1, wherein a threaded hole (121) is formed in the end hole (12)

of the connector (11), the tube (100) has a threaded rod (200) which is threadedly connected to the threaded hole (121).

7. The suction cup structure as claimed in claim 1, wherein the magnet (2) includes a recessed area (22) located corresponding to the suction cup (42), when the suction cup (42) is deformed, the suction cup (42) is accommodated within the recessed area (22).

\* \* \* \* \*